US008446907B2

(12) United States Patent
Du et al.

(10) Patent No.: US 8,446,907 B2
(45) Date of Patent: May 21, 2013

(54) MEDIUM ACCESS CONTROL METHOD AND APPARATUS IN WIRELESS DISTRIBUTED NETWORK

(75) Inventors: Lei Du, Beijing (CN); Lan Chen, Beijing (CN); Akira Yamada, Kanagawa (JP); Atsushi Fujiwara, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 1077 days.

(21) Appl. No.: 11/524,614

(22) Filed: Sep. 20, 2006

(65) Prior Publication Data

US 2007/0076742 A1 Apr. 5, 2007

(30) Foreign Application Priority Data

Sep. 20, 2005 (CN) .......................... 2005 1 0103392

(51) Int. Cl.
*H04J 1/02* (2006.01)
(52) U.S. Cl.
USPC ........... 370/394; 370/338; 370/474; 370/445; 714/746; 714/749
(58) Field of Classification Search
USPC .................. 370/349, 332, 333, 338, 394.474, 370/445–448; 714/746–751
See application file for complete search history.

(56) References Cited

U.S. PATENT DOCUMENTS

| 5,065,153 | A | * | 11/1991 | Tomita et al. | ................. | 370/447 |
| 2005/0238054 | A1 | * | 10/2005 | Sharma | ........................ | 370/473 |
| 2006/0165021 | A1 | * | 7/2006 | Tian et al. | ..................... | 370/310 |
| 2008/0130622 | A1 | * | 6/2008 | Hiertz et al. | .................. | 370/348 |

OTHER PUBLICATIONS

Mujtaba, S. A.: "Bi-Directional Data Transfer" IEEE P802.11 Wireless LANs, 7.1.10, pp. 58-60.

* cited by examiner

*Primary Examiner* — Ajit Patel
(74) *Attorney, Agent, or Firm* — Blakely, Sokoloff, Taylor & Zafman LLP

(57) ABSTRACT

A pair scheduling medium access control method used in a wireless network, comprises the steps of: checking, by a receiving node, whether a transmitting node has data packets to be subsequently sent, according to data packets received from the transmitting node; when the transmitting node has no data packets to be subsequently sent, checking whether the receiving node has data packets to be sent to the transmitting node or not; if the receiving node has data packets to be sent to the transmitting node, then adding a time period required for sending the data packets of the receiving node into an acknowledgement packet to be sent to the transmitting node; after the receiving node receives a Clear to Send packet sent from the transmitting node, sending the data packets in the receiving node to the transmitting node.

15 Claims, 7 Drawing Sheets

MEDIUM ACCESS CONTROL METHOD AND APPARATUS IN WIRELESS DISTRIBUTED NETWORK

PRIORITY

The present application claims priority to and incorporates by reference the entire contents of Chinese Patent Application No. 200510103392.5, filed in China on Sep. 20, 2005.

BACKGROUND OF THE INVENTION

1. Field of the Invention

The present invention relates to Medium Access Control (MAC) methods and apparatuses in a wireless distributed network, and more particularly to a distributed MAC method and apparatus for scheduling respective transmissions between respective independent transmission node pairs, to effectively reduce probability of packet collision occurring in accessing channels, and to improve throughput and decrease the system overhead caused by control packets.

2. Description of Prior Art

With the prevalence of the wireless portable terminals and the rapid development of the wireless communication service in various fields, the future mobile communication systems are required to implement an "ubiquitous" communication, that is to say, to ensure effective wireless transmission at anytime and anywhere.

In a conventional cellular network, the communications between the mobile terminals must be achieved by use of the handover of base stations and (or) mobile switches, which makes the communication limited by some factors such as geographical regions. Thus, a Wireless Local Area Network (WLAN) is proposed as a more flexible wireless access network in order to be the supplement and development to the fixed network, thereby making the "ubiquitous" communication possible. The WLAN generally has two different network structures, either using a wireless access point to achieve inter-terminal communications in the network such as Bluetooth and Distributed Antenna System (DAS), or using random resource competition in an ad hoc manner to achieve flexible networking such as a typical system with Mobile Ad Hoc Network (MANET). Since the former still uses a centralized control similar to that in a cellular network, in some environments such as an area not accessible by the signal from the central controller, the mobile communication technique cannot work. In the case of the latter, a wireless distributed network, which is completely distributed and doesn't rely on any infrastructures, will therefore be a more effective manner for extending network and achieving the "ubiquitous" communication.

For such wireless distributed networks without fixed equipments, a set of mobile terminals equipped with wireless transceiver will flexibly constitute a temporary multi-hop autonomous system with recognized protocols. Because there is no absolute central control unit in the network, all the nodes are equivalent, and the nodes in the network cooperate using distributed algorithms without manual intervention and any other preset network facilities. Therefore, quick deployment of the network at anytime and anywhere is achieved. However, independency of respective nodes in the wireless distributed network makes each node only able to use its own information to determine channel competitions, so the randomness of the resource sharing increases. Thus, it becomes an important factor affecting the overall performance of the wireless distributed network which distributed algorithm is used to coordinate the respective behaviors, that is, the medium access control method.

Medium access control is a protocol in which multiple users or nodes fairly and effectively share a channel. According to the presence or absence of a central control unit in the network, it may be classified into centralized and distributed medium access control methods. In the medium access control methods in which the coordination is performed by the central control unit, the control unit uniformly schedules the transmissions of each node based on its knowledge about requirements and communication conditions of all the nodes in the network, and thus can effectively utilize the resources. But, due to the existence of the central control unit (node), the system overhead inevitably increases, and the flexibility of the system is reduced. Therefore, in practical application, the distributed networks are mostly used, which facilitates the rapid self-organization of networks, and fully reflects the self-organization character of the wireless network. However, the independent resource competition of each node in the wireless distributed network will inevitably result in packet collision. As compared with the former, the distributed medium access control method is subjected to the following problem: a major object for designing a distributed medium access control method is how to reduce a probability of packet collision and improve throughput as much as possible on the basis of as little as possible knowledge about information of other nodes.

The earliest and the most basic distributed medium access control method is ALOHA protocol proposed by N. Abramson. See N. Abramson, The ALOHA system-Another alternative for computer communications, Proc. AFIPS Conf. Montvale, N.J.: AFIPS Press, 1970, vol. 37. This prior art proposes a scheme in which each node in the network immediately sends data on the channel once a packet arrives.

In order to decrease the probability of packet collisions, L. Kleinrock and S. Lam propose to slot the time axis, and require that a transmitting time instant of a user must be the beginning of a discrete slot, that is, S-ALOHA. See L. Kleinrock and S. Lam, Packet-switching in a Slotted Satellite Channel, Proc. Nat. Computer Conf., AFIPS Conf., vol. 43, 1973, pp. 703-701. However, such a random access protocol for packet collisions can only achieve a maximum channel utilization ratio of 36%, resulting a severe resource waste. For this reason, L. Kleinrock and F. A. Tobagi further propose a carrier sense protocol. See CSMA, L. Kleinrock and F. A. Tobagi, Packet Switching in Radio Channels: Part I—Carrier Sense Multiple Access Modes and their Throughput-delay Characteristics, IEEE Trans. Commun., vol. COM-23, pp. 1400-1416, December 1975, which discloses using the sensed channel conditions as a basis of packet transmissions, such that the packets are sent only when the sensed channel is in an idle state. Based on the principle of CSMA, Sidhu, R. Andrews and A. Oppenheimer propose a Carrier Sense Multiple Access with Collision Avoidance (CSMA/CA) protocol. See G. Sidhu, R. Andrews, A. Oppenheimer, Inside Appletalk, Addison-Wesley, 1989, in which the system performance is further improved by randomizing the channel access time instants. Due to the simple implementation, it is widely used. However, with the development of the communication networks, the wireless distributed network is required to support higher-speed data transmissions and more extensive services. These distributed medium access control protocol cannot fulfill the network requirements, especially in that problems of hidden terminals and exposed terminals become the barrier factors for the performance improvement.

The problem of hidden terminals means that two transmitting nodes outside respective sensing ranges with respect to each other send data packets to one and the same receiving node. At the receiving node, packets from two different transmitting nodes will collide, which results in the deterioration of the system performance. On the other hand, when two transmitting nodes can sense each other's transmissions and their respective receiving nodes are out of the respective sensing ranges, one node suppresses its own packet transmissions once it senses that the other node is sending. But in fact, a simultaneous packet transmission of these two pairs will not influence each other. Such a transmission may be performed but is forbidden due to the sensing of peripheral nodes' transmissions will waste the system resources, which is known as the problem of exposed terminals.

For solving the above problems, some medium access control methods propose to use some short control packet switching information before data packet transmissions in order to reduce the collision probability of data packets. In P. Karn's MACA method, see P. Karn, MACA: a New Channel Access Method for Packet Ratio, IEEE Computer Networks Conference, 1990, the carrier sense is no longer utilized. But it is proposed to exchange short Request To Send (RTS) packet and Clear To Send (CTS) packet in order to preserve channels for subsequent data packet (DATA) transmissions. V. Bharghavan et al proposed an MACAW method, see V. Bharghavan, A. Demers, S. Shenker and L. Zhang, MACAW: a Medium Access Control for Wireless LANs, ACM SIGCOMM Conference on Communications Architectures, Protocols, and Architectures, London, England, September 1994. This method adds an Acknowledgement (ACK) packet for acknowledging correct reception of the data packets, based on the MACA. Similarly, W. Diepstraten et al proposed a DFWMAC method, see W. Diepstraten, G Ennis and P. Belanger, Distributed Foundation Wireless Medium Access Protocol, IEEE, P802.11/93-190; and C. L. Fullmer et al proposed FAMA, see C. L. Fullmer and J. J. Garcia-Luna Aceves, Solutions to Hidden Terminal Problems in Wireless Networks, ACM SIGCOMM Conference on Communication Architectures, Protocols and Architectures, Cannes, France, September 1997. These methods all use a handshaking procedure of RTS-CTS-DATA-ACK based on the carrier sensing, and the problems of hidden terminals and exposed terminal are well solved by virtual channel preservations.

On the basis of the above schemes, the 802.11 standard defines a Distributed Coordination Function (DCF) for Contention Period (CP) which is based on the Carrier Sense Multiple Access with Collision Avoidance (CSMA/CA) protocol and each node independently decides to access the channel and when it fails, enters into a backoff procedure in order to re-access the channel. In addition, the DCF uses a handshaking procedure of DATA/ACK or RTS/CTS/DATA/ACK, and along with a Network Allocation Vector (NAV), provides a more flexible and effective wireless communication protocol in a self-organized manner.

Next, the distributed coordination function with a handshaking procedure of RTS/CTS will be described with reference to FIG. 1. In particular, as shown in FIG. 1, when one transmitting node in the wireless network has a packet arriving, if it senses that a channel is idle and an idle time period is more than or equal to a DCF Interframe Space (DIFS), then an RTS packet is immediately sent. On the contrary, if it senses that the channel is busy or the idle time period is less than DIFS, then a backoff procedure is performed until the channel is idle and the idle time period is equal to DIFS. After the backoff procedure, the RTS packet is sent. The RTS packet contains a Transmitter Address (TA), a Receiver Address (RA), and a Duration required for finishing subsequent packet transmission. Here, a value of the Duration indicates a time period during which the channel is to be occupied, and thus functions as the channel preservations. The value of the Duration equals to a sum of a duration required for sending the subsequent data packet (DATA), a time period for sending one CTS packet, a time period for sending one ACK packet, and a time period of three Short Interframe Spaces (SIFS). It should be noticed that the RTS/CTS is not necessary, but optional. The operator may decide whether the RTS/CTS is used or not, or in which cases the RTS/CTS is used, according to its particular implementations. Generally, one parameter is used to indicate a threshold of a packet length for which the RTS/CTS will be used, and when the data packet is equal or longer than that threshold, the RTS/CTS handshaking procedure is used. If the data packet is less than the threshold, the RTS/CTS handshaking procedure is then not necessary, and the data packet is directly sent.

After correctly receiving the RTS and waiting for one short interframe space, the receiving node responds with the CTS packet, the contents of which include the Receiver Address RA copied from the TA field of the received RTS and a duration required for finishing subsequent packet transmission. The duration is equal to the Duration value copied from the received RTS minus the time period for sending the CTS packet and a time period of one SIFS (i.e., the SIFS before the receiving node sends the CTS packet shown in FIG. 1). After successfully receiving the CTS sent back by the receiving node, the transmitting node waits for one SIFS, and then sends the DATA packet.

DCF utilizes a data packet transmission mechanism that supports fragmentation. When a data packet from an upper layer is long, for example, more than a data fragment threshold length defined in the MAC layer, this data packet will be divided. That is to say, when data is long, it will be divided into multiple fragments. At the header of the packet or the packet fragment, a field More Fragments of 1 bit is defined for indicating whether a fragment belonging to the data packet is not yet transmitted. For example, when a value of the field More Fragments is "1", it may indicate that more fragments are not yet transmitted. In other cases, the value of the field More Fragments will be "0". The field More Fragments is also contained in the data packet and the data packet fragment. When the receiving node receives one fragment, it checks whether the value of More Fragments is zero or not. If the value of More Fragments is not zero, then it means some fragments are not yet transmitted. In this case, the value of the Duration field of this data packet is equal to a sum of a time period for sending next data packet fragment, a time period for sending two ACKs, and a time period of three SIFSs (i.e., the duration field of Fragment 0 shown in FIG. 1 will indicate that the channel will be preserved until a time instant of the end of ACK1). The duration value of the ACK responded by the receiving node will not be zero, but equal to the value of the duration copied from the duration field of the received data packet fragment minus a time period for sending one ACK packets and a time period of one SIFS (i.e., the duration field of ACK 0 shown in FIG. 1 also indicates that the channel will be preserved until the time instant of the end of ACK1). When successfully receiving all fragments of the data packet, the receiving node waits for one SIFS, and then sends an acknowledgement (ACK) packet for confirmation. When the last fragment is sent, the last responded ACK has a duration of zero (i.e., the value of the duration of ACK3 shown in FIG. 1 is zero).

Simultaneously, for avoiding packet collisions among the hidden terminals, all the non-receiving nodes that successfully receive the RTS within the communication range of the transmitting node, and all the non-transmitting nodes that successfully receive the CTS within the communication range of the receiving node, after receiving the above packets, compare Duration values of these packets with the current NAV values of their own, and update the NAV values with a larger one. All the nodes negotiate that only when its NAV value is zero, a contention will be initiated in order to access a wireless channel.

Thus, by use of the handshaking procedures and the carrier sense based on backoff algorithm, the collision probability that each independent node accesses the channel is reduced in the distributed network; and by use of introducing NAV to virtually preserve the wireless resources, packet access of other nodes within the communication ranges of the current pair of the communication nodes is suppressed. To a certain extent, a collision-free transmission of the data packets of the current pair of the communication nodes is ensured.

Although the above prior arts may reduce the probability of the data packet collisions through carrier sense and short packet exchanges, compared with central coordinated MAC protocols, the performance of the distributed medium access control method is still limited by the packet collisions occurring in the course of the nodes' contentions of channels.

SUMMARY OF THE INVENTION

A medium access control method and apparatus in wireless distributed network is described. In one embodiment, a pair scheduling medium access control method used in a wireless network, comprises checking, by a receiving node, whether or not a transmitting node has data packets to be subsequently sent, according to data packets received from the transmitting node; when the transmitting node has no data packets to be subsequently sent, checking whether the receiving node has data packets to be sent to the transmitting node or not; if the receiving node has data packets to be sent to the transmitting node, adding a time period required for sending the data packets of the receiving node into an acknowledgement packet to be sent to the transmitting node; and after the receiving node receives a Clear to Send packet sent from the transmitting node, sending the data packets in the receiving node to the transmitting node.

BRIEF DESCRIPTION OF THE DRAWINGS

The above and other embodiments, features and advantages of the present invention will be apparent from the following description of the preferred embodiment of the present invention with reference to the drawings in which.

DETAILED DESCRIPTION OF PREFERRED EMBODIMENTS

Figure 1:
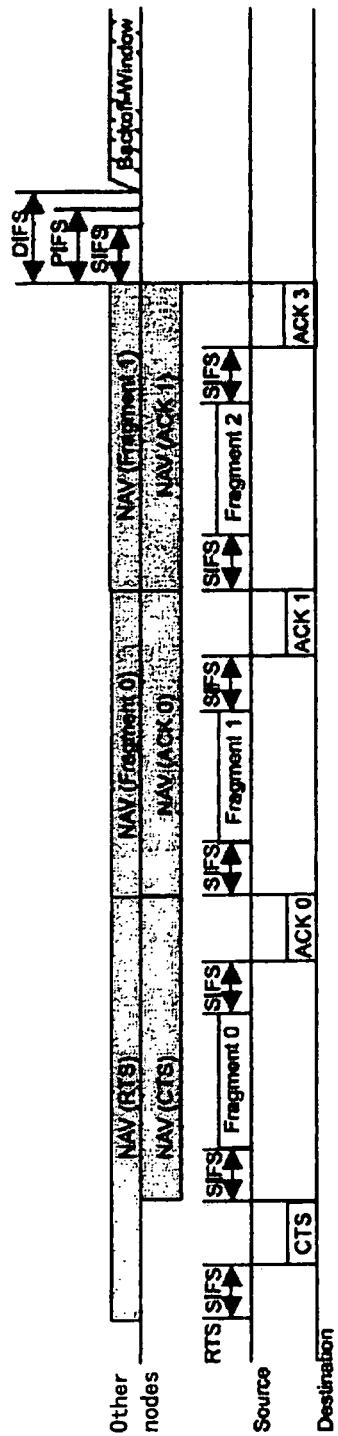
FIG. 1 is a schematic diagram for illustrating a handshaking procedure based on Request to Send packet/Clear to Send packet/data packet/acknowledgement packet for a mobile node (a mobile terminal) in a wireless network according to the prior arts.

The present invention introduces the idea of centralized medium access control methods into the wireless distributed networks. That is, some nodes use known information to schedule the transmissions of other nodes in order to avoid the independent contention of channels of each node, to better utilize the channel resources, and not to affect the operation and hardware implementation of the system. Simultaneously, by considering the backward compatibility of the scheme, the present invention is based on the wide-accepted 802.11 protocol, and practices more effective channel utilization without any increase of hardware overhead.

Embodiments of the present invention include a medium access control method and device in a wireless distributed network, after one pair of nodes successfully win a channel, this method and device can use one party of the current transmission pair to schedule the packet transmission of the other party, in order to make both of them immediately transmit the packets without new channel contentions when having packets directed to the counterpart, and to improve the system throughput.

According to one embodiment of the present invention, a pair scheduling medium access control method used in a wireless network is provided, comprising: checking, by a receiving node, whether a transmitting node has data packets to be subsequently sent, according to data packets received from the transmitting node; when the transmitting node has no data packets to be subsequently sent, checking whether the receiving node has data packets to be sent to the transmitting node; if the receiving node has data packets to be sent to the transmitting node, then adding a time period required for sending the data packets of the receiving node into an acknowledgement package to be sent to the transmitting node; after the receiving node receives a Clear to Send packet sent from the transmitting node, sending the data packets in the receiving node to the transmitting node.

According to another embodiment of the present invention, a pair scheduling medium access control method used in a wireless network is provided, comprising when a receiving node receives from a transmitting node a data fragment packet destined to the own node, detecting a value of a fragment field in a frame control field of the packet in order to determine whether the transmitting node has finished the sending of all the data fragment packets; if the transmitting node has finished the sending of all the data fragment packets, judging whether the transmission between the transmitting node and the receiving node has reached a maximum allowable number N of times for pair scheduling of the receiving node, wherein N is an integer; when the number of times for the performed pair scheduling is less than the allowable threshold N, detecting whether the receiving node has data packets to be sent to the transmitting node stored therein; if the receiving node has the data packets to be sent to the transmitting node, setting a duration field in an acknowledgement packet to be sent to the transmitting node, sending the acknowledgment packet, and incrementing the number of times for pair scheduling by 1.

According to further embodiment of the present invention, a pair scheduling medium access control method used in a wireless network is provided, comprising: receiving, by a receiving node, data packet fragments sent from a transmitting node to the receiving node, and checking whether the sending of the data packets from the transmitting node has already been finished; when the sending of the data packets from the transmitting node has been finished, checking whether the receiving node itself has data packets to be sent to the transmitting node; when there are the data packets to be sent to the transmitting node, setting information indicating that the receiving node will send data packets to the transmitting node, in an acknowledgement packet for responding to the data packets received from the transmitting node.

According to a further embodiment of the present invention, a mobile terminal used in a wireless network is provided, for performing pair scheduling medium access control in the wireless network, where the mobile terminal comprises: a transmission storage for storing data packets arriving from a higher layer; a channel accessing unit for determining whether a present node is allowed to access a channel or not based on a network protocol; a packet processor for detecting whether a data packet is received, detecting a packet type thereof, and detecting whether a value of a fragment field in the data packet is equal to zero or not; a pair scheduler for detecting the number of times for pair scheduling according to the process result of the packet processor on the received data, and after performing a pair scheduling transmission in order to send a data packet, incrementing the number of times for pair scheduling by 1; a network allocation vector storage timer for storing a network allocation vector, and updating a value of the network allocation vector according to the process result of the packet processor.

According to one embodiment of the present invention, not only the packet collisions due to the channel access procedure are avoided, but also the system overhead due to the sending of control packets such as RTS, CTS, ACK is reduced, and the utilization ratio of the channel resources is improved. By setting the allowable number of times for pair scheduling, the wireless distributed network may easily support different Quality of Service (QoS) including the multiple-rate transmission etc., and better satisfy the requirements of the wireless multimedia services. Additionally, embodiments of the present invention is based on the wireless distributed network without fixed facilities, completely compatible with the frame formats existing in 802.11, without any hardware overhead. It can be simply implemented, and has a good backward compatibility.

The embodiments of the present invention will be described in detail with reference to the drawings. Those unnecessary details and functions are omitted in order to avoid any confusion.

Figure 2:
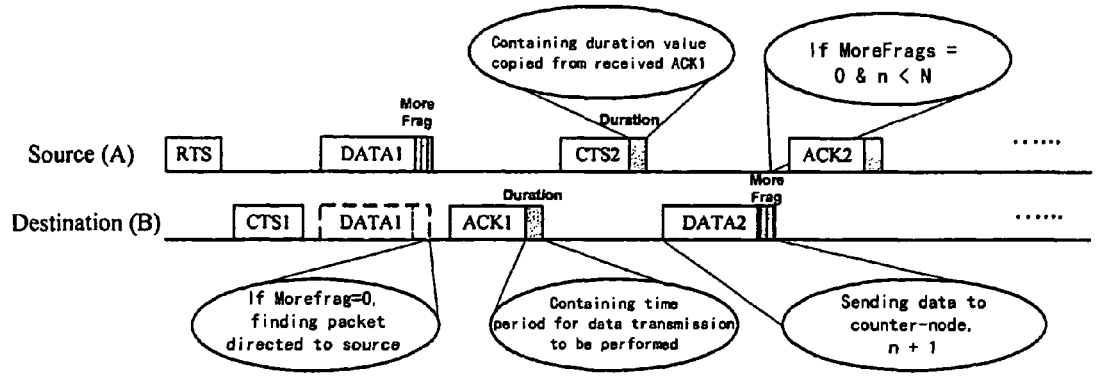
FIG. 2 is a principle diagram of a medium access control according to one embodiment of the present invention.

First, the implementing principle of the present invention will be described referring to FIG. 2. As shown in FIG. 2, it can be assumed that a wireless node A in a wireless self-organized network is a transmitting node that sends data packets, and a wireless node B is a receiving node as a destination of the data packets sent by the wireless node A.

When the transmitting node A is going to send a data packet to the receiving node B, the node A initially sends an RTS packet to the network. After receiving the RTS packet, the node B checks whether a receiver address RA in the RTS packet is identical to the present node. If the addresses are identical, then a CTS1 packet is sent to the node A. Thereafter, the transmitting node A sends a data packet (DATA1) (which may contain multiple fragments) to the receiving node B. When successfully receiving one data or data fragment packet, the node B checks whether a receiver address (RA) of the packet is identical with that of the present node or not. If the addresses are not identical, then a value of a Duration field of the packet is extracted and compared with a current NAV of the present node, and the NAV is updated with a larger one. If the addresses are identical, then it means the present node is the receiving node to which the data or data fragment packet is directed. Each time the node B receives a data packet, it is further detected whether a More Fragments field of a frame control filed of the packet is zero or not. If the More Fragments field is zero, then it indicates that the node A has no other data packet to be sent. In this case, the node B generally responds with one ACK.

In the case that a data packet with a More Fragments field of zero is received, the receiving node B checks whether there is any data packet in its memory to be sent to the transmitting node A which is now in communication with the node B. If there is any data packet to be sent to the node A in the memory, then the data packet is scheduled into a header portion of the memory in order to prepare for sending this data packet to the node A. Such case is equivalent to a case where the node A schedules the node B to send a data packet to Node A. That is, the node A temporarily functions as a central control unit. If there is no data packet to be sent to the node A in the memory of the node B, then the node B directly responds to the node A with one ACK1, in which the value of the duration field contained is zero to indicate the end of the transmission procedure.

In a case where the node B has a data packet to be sent to the node A, the value of the duration field contained in the ACK1 responded by the node B is not zero but indicates a time period during which the node B is going to send the subsequent packets. After receiving the ACK1 sent by the node B, the node A checks whether the value of the duration field therein is zero or not. Here, since the node B is going to send a data packet to the node A, the value of the duration field is not zero. Thereby, the node A may determine that the node B has a data packet to be sent to the node A. Then, the node A responds to the node B with a CTS2. A value of the duration field in the CTS2 is the value of the duration field contained in the ACK1 received from the node A minus a time period for sending the CTS2 and a time period of one SIFS. That is to say, the ACK1 sent by the node B corresponds to one RTS. Thus, ACK 1 has two functions, one of which is to respond to show that the data packet from the node A is successfully received, and the other is to preserve the channel for the subsequent data transmission of the node B by setting NAV values of the peripheral nodes around the node B. After receiving the CTS2, the receiving node B may send the data packet (DATA2) to the node A. After receiving the DATA 2 sent by the node B, the node A checks whether the value of the More Fragments contained therein is zero or not. If it is zero, then it indicates that the node B has finished its data transmission.

A technical solution according to one embodiment of the present invention is equivalent to elongate a transmission period between the transmitting node and the receiving node, during which, these two nodes do not need to newly access the channel, and send no additional RTS and CTS without any additional channel contentions, and some backoff times are omitted.

According to one embodiment of the present invention, a parameter N is introduced to indicates the number of times for which the receiving node B is allowed to send a data packet to the transmitting node A in the above cases, that is, a maximum allowable number of times for pair scheduling, i.e., a concept of the number of times for pair transmissions. In a case where the receiving node receives a data packet with a More Fragments field of zero, and there is a data packet in the memory of the present node to be sent to the transmitting node which now is in communication therewith, it is detected whether or not the number of times for the currently performed pair scheduling of the node is less than the threshold value N. Only when the number of times for the currently performed pair scheduling is less than the threshold value N, the value of the duration field of the ACK is set as above. Otherwise, the duration field of the ACK is set to zero to end the transmission between this node pair. The introduction of the N number of times for pair scheduling is to avoid a case where the transmitting node A and the receiving node B occupy the channel for a long time and make the other nodes in the network unable to access the channel, which might result in an unfair situation. According to one embodiment of the present invention, the number of times for pair scheduling is adjustable. It can be adjusted according to the types of the services or the Quality of Service (QoS). If the priority of a service is high, such as voice service which requires immediate transmission, then the value of N (N is an integer) may be adjusted into a larger number, that is, an increased number of transmissions are performed. If the priority is low, then it may be ended after sending once.

Next, the embodiment of the medium access control apparatus in the wireless distributed network according to one embodiment of the present invention will be described by referring to FIG. 3. It should be noticed that the medium access control apparatus is provided in nodes acting as mobile terminals, and for clarity, the transmitting node and receiving node, respectively, refer to the node that originally sends data and receives data when initiating one communication. It may be understood that in a case where the receiving node has data to be sent to the transmitting node, the actual functions of the transmitting node and the receiving node are changeable in the course of the communication.

Figure 3:
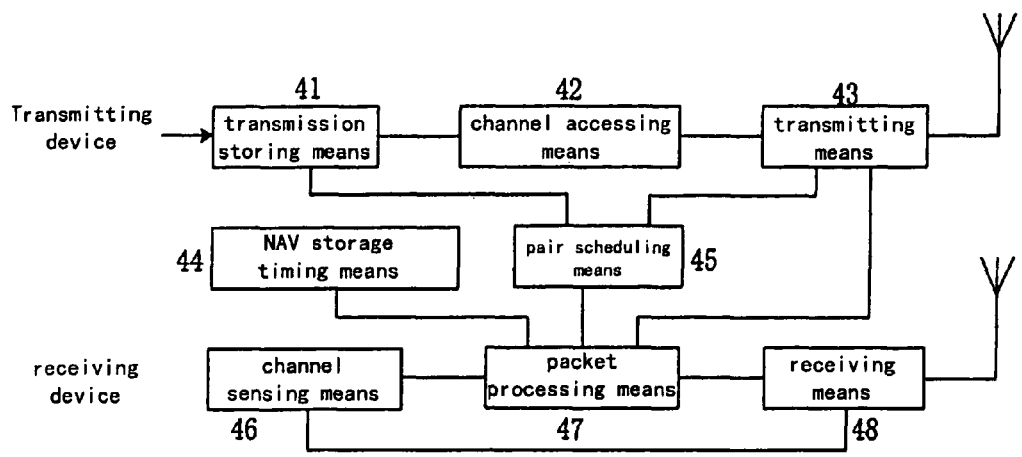
FIG. 3 is a block diagram of a medium access control apparatus in a wireless distributed network according to an embodiment of the present invention.

As shown in FIG. 3, the medium access control apparatus of the present invention includes a transmitting device, a receiving device and a network allocation vector (NAV) storage timing means 44 (e.g., NAV storage timer). The transmitting device includes a transmission storing means 41 (e.g., a storage unit), a channel accessing means 42 (e.g., a channel access unit) and a transmitting means 43 (e.g., a transmitter). The receiving device includes a receiving means 48 (e.g., a receiver), a pair scheduling means 45 (e.g., a pair scheduling unit), a channel sensing means 46 (e.g., a channel sensing unit) and a packet processing means 47 (e.g., a packet processor).

The transmission storing means 41 stores data packets arrived from an upper layer. The channel accessing means 42 determines whether the present node is currently allowed to access channel or not according to CSMA/CA protocol employed by a specification such as 802.11DCF the like. The transmitting means 43 sends data packets. In particularly, when the channel accessing means 42 indicates that the channel access conditions are satisfied, a packet to be sent is fragmented. If the data or data fragment to be sent is longer than an RTS threshold length employed, then an RTS packet is sent. On the contrary, the data or data fragment packet to be sent is directly sent. In addition, the transmitting means 43 sends a corresponding packet according to the result indicated by the packet processing means 47 and the pair scheduling means 45.

The receiving means 48 receives a data packet from a wireless channel, and passes them into the packet processing means 47 for detection and judgment.

The packet processing means 47 detects the data packet received by the receiving means 48, and performs the next operation according to the detection result. In particularly, the packet processing means 47 detects whether a data packet is successfully received and detects the packet type thereof. If a data packet is successfully received, then it is detected whether a receiver address field contained in the data sent by the transmitting node of the packet is identical with the address of the present node or not. If the addresses are identical, then it is further detected whether or not the value of the More Fragment field in the data or data fragment packet is zero, and in a case of being zero, the result is delivered into the pair scheduling means 45. The address of the transmitting node of the data or data fragment packet is included in the More Fragments field. If the value of the More Fragments field in the data fragment packet is not zero, then the result is delivered into the transmitting means 43 in order to prepare for sending the acknowledgement packet ACK, the Duration field of which is equal to the Duration field of the received data fragment minus one SIFS and a time period for sending the ACK. If it is detected that the receiver address of the packet is not identical with that of the present node, then the value of the Duration field of the data or data fragment packet is extracted, and is delivered into the NAV storage timing means 44 to be compared with the currently stored NAV value, and the NAV is updated with a larger value.

If the transmitting node detects that an acknowledgement packet is successfully received, then it is detected whether a receiver address field contained in the packet is identical with that of the present node. If the addresses are identical, it is further detected whether a subsequent data fragment is to be transmitted. When the transmission of all the data fragments is completed, it is detected whether a Duration field of the received ACK packet is zero or not. If the Duration field of the ACK packet is detected to be zero, then the transmitting node starts the channel sensing means 46 in order to enter a channel sensing state. Otherwise, the transmitting node delivers the detection result into the transmitting means 43 in order to prepare for sending a CTS packet, and increments the number of times for the currently performed pair scheduling by 1. The value of the Duration field of the CTS packet is equal to the value copied from the Duration field of the ACK received from the receiving node minus one SIFS and a time period for sending the CTS. If the packet processing means 47 detects that a subsequent data fragment is to be transmitted, then the detection results is delivered into the transmitting means 43 in order to prepare for sending the subsequent data fragment packet. If it is detected that the receiver address in the received ACK packet is not identical with that of the present node, then the value of the Duration field of the data or data fragment packet is extracted, and is delivered into the NAV storage timing means 44 to be compared with the currently NAV value, and the NAV is updated with a larger value. If an RTS packet is successfully received, then the result is delivered into the transmitting means 43, and the data packet to be sent is fragmented for sending the first data fragment packet.

The pair scheduling means 45 receives the process result of the packet processing means 47 on the data received by the receiving means 48, and performs a determination and a detection for pair scheduling. In particularly, when the pair scheduling means 45 receives the process result of the packet processing means 47, it is determined whether the number of times for the currently performed pair scheduling of the present node has reached the maximum allowable number N of times for pair scheduling or not. If yes, the value of the Duration field is set into zero and an ACK packet is sent through the transmitting means 43. If the determination result is that the maximum allowable number N of times for pair scheduling is not reached, then it is determined whether there is any packet in the transmission storing means 41 which has a destination node address identical with the transmitter address from the packet processing means 47, that is, it is detected whether there is any packet directed to the source transmitting node stored in the transmission storing means 41 or not. If yes, the packet is scheduled and fragmented, and a time period required for sending the first data fragment packet is calculated. The sum of the above time periods, a time period for sending the CTS, a time period for sending the ACK, and a time period of three SIFSs is used as the value of the Duration field of the ACK packet, and then is delivered into the transmitting means 43 for sending the ACK packet. In the same time, the number of times for the currently performed pair scheduling is incremented by 1. If there is no packet in the transmission storing means 41 is detected to be directed to the source transmitting node, or the number of times for the currently performed pair scheduling of the present node has reached the maximum allowable number of times for pair scheduling, then an ACK packet with a Duration value of zero is sent by using the transmitting means 43.

The channel sensing means 46 receives the process result from the packet processing means 47, and senses the channel. When the channel is sensed to be busy, the receiving means 48 is activated to prepare for receiving data from the wireless interface.

The NAV storage timing means 44 is used for storing the network allocation vector (NAV), and updates the NAV value according to the process result of the packet processing means 47.

Figure 4:
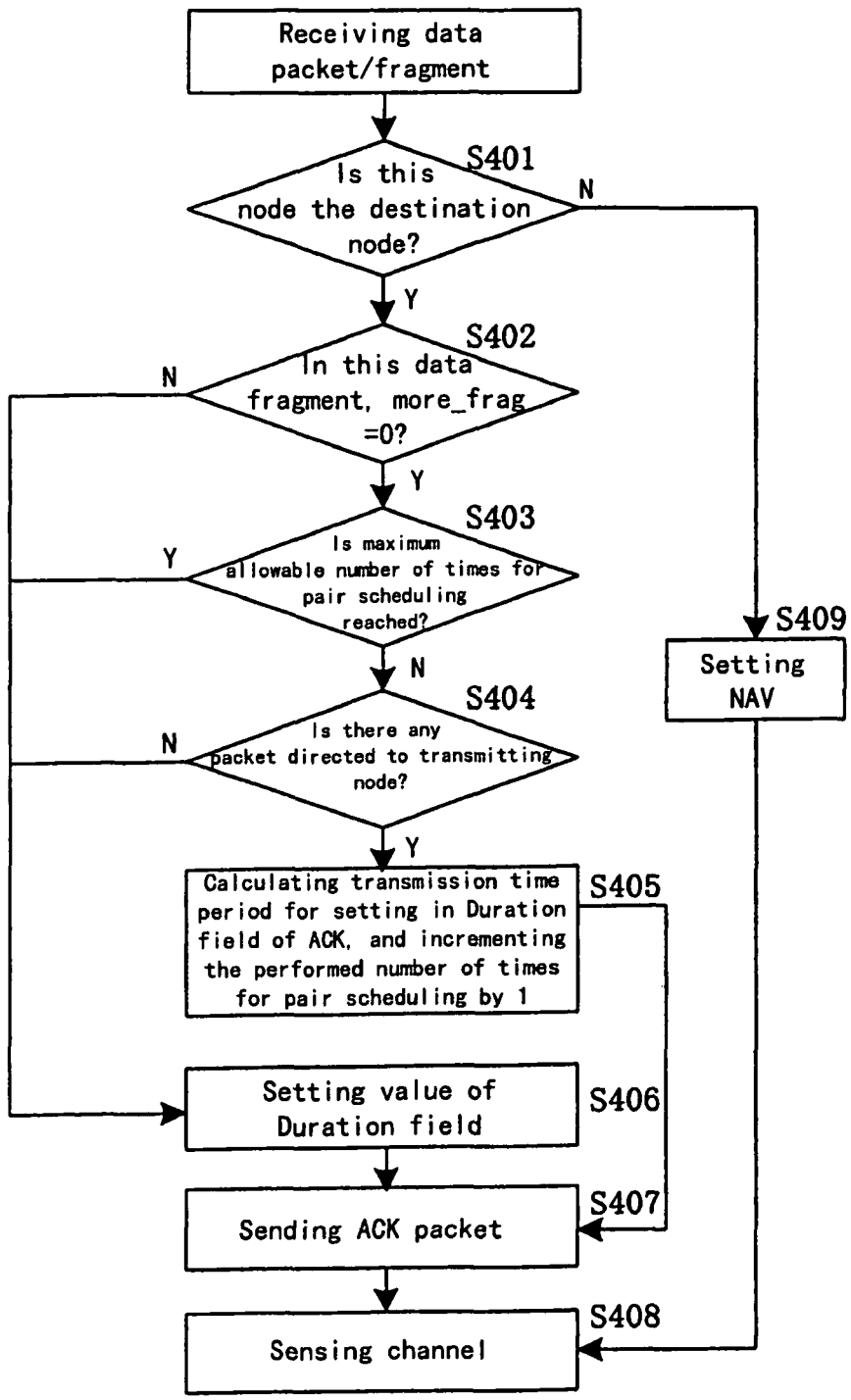
FIG. 4 is a process flowchart of a wireless receiving node in the wireless distributed network when successfully receiving one data packet or data segment, according to one embodiment of the present invention.

Next, a process flowchart of the wireless receiving node in the wireless distributed network when receiving a data packet or a data fragment according to the embodiment of the present invention will be described referring to FIG. 4. When the receiving node successfully receives one data or data fragment packet, at step S401, it is detected whether a receiver address (RA) contained in the received packet is identical with that of the present node or not. If the addresses are not identical, then a value of a Duration field of the packet is extracted, and then is compared with the NAV value currently stored in the NAV storage timing means 44 of the present node; and at step S409, the NAV value is updated with a larger value according to the comparison result.

If it is determined in step S401 that the receiver address (RA) contained in the received packet is identical with that of the present node, then it indicates that the present node is the destination receiving node to which the data or data fragment packet is directed. Then, the process goes to step S402 in which it is further detected whether a value of More Fragments field in the frame control field of the packet is zero or not. If the More Fragments is zero, then it means the transmitting node has completed the sending of all the data fragments. In this case, the process goes to step S403 in which it is further determined whether the transmissions between the transmitting node and the receiving node have reached the maximum allowable number N of times for pair scheduling or not. When the determination result of step S403 indicates that the number of times for the performed pair scheduling is less than the allowable threshold N, at step S404, it is detected whether or not there is any data packet to be sent to the transmitting node stored in the transmission storing means 41 of the receiving node. If there is a data packet to be sent to the transmitting node, then the process goes to step S405, the data packet is scheduled and fragmented (if the length of the data packet is longer than that permitted by MAC layer). Thereafter, the time period required for sending the data or data fragment is calculated, and then is added to the time period for sending one CTS and one ACK as well as the time period of three SIFSs. The calculated time is set in the Duration field of the ACK packet, and at step S407, the ACK packet is sent. Meanwhile, the number of times for pair scheduling of the node is incremented by 1.

If it is determined at step S402 that the value of the More Fragments field is not zero, then it indicates that the transmitting node still has some data fragments to be sent. At this time, the receiving node prepares for sending an ACK packet, and at step S406, sets the value of the Duration field thereof into a value equal to the Duration value extracted from the received data or data fragment packet minus one SIFS and the time period f6r sending the ACK packet.

If it is determined at step S403 that this receiving node has reached the maximum allowable number N of times for pair scheduling, then the process goes to step S406 in which the value of the Duration field of the ACK packet is set into zero, and at step S407, the ACK packet is sent. In addition, if it is determined at step S404 that no data packet in the transmission storing means of the receiving node is found to be sent to the transmitting node, the process also goes to step S406 in which the value of the Duration field of the ACK packet is set into zero, and at step S407, the ACK packet is sent.

In the above cases, after the ACK packet is sent at step S407, the receiving node enters into a channel sensing state at step S408.

Figure 5:
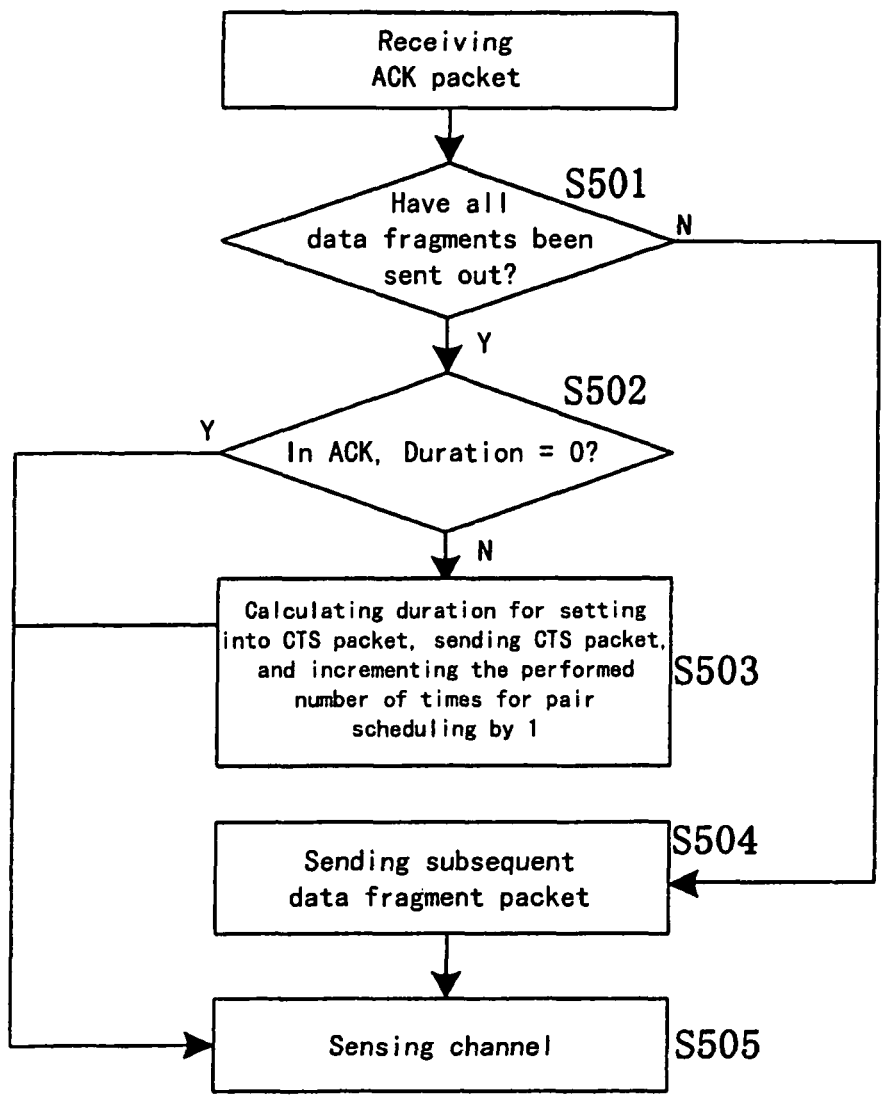
FIG. 5 is a process flowchart of a wireless transmitting node in the wireless distributed network when successfully receiving an acknowledgement packet, according to one embodiment of the present invention.

Next, a process flowchart of the wireless transmitting node in the wireless distributed network when successfully receiving an acknowledgement packet according to the embodiment of the present invention will be described by referring to FIG. 5. As shown in FIG. 5, when the transmitting node successfully receives from the receiving node, one acknowledgement (ACK) packet sent back with respect to the sent data packet, it is detected whether a receiver address (RA) of the packet is identical with that of the present node or not. If the addresses are not identical, then a value of a Duration field of the packet is extracted, and then is compared with the NAV value currently stored in the NAV storage timing means 44 of the present node; and the NAV value is updated with a larger value according to the comparison result. If these two addresses are identical, then it indicates that the ACK packet is a response to the data or data fragment packet previously sent by the present transmitting node. Thus, at step S501, it is detected whether the data fragments of the present node have been sent out or not. If it is determined at step S501 that the data fragments haven't been sent out, then the process goes to step S504 in which the transmitting node continues to send the subsequent data fragment packet. When the transmitting node determines at step S501 that all the data packets have already been sent out, the process continues to step S502 in which it is detected whether a value of a Duration field of the ACK packet received from the receiving node is zero or not. When the value of the Duration field contained in the ACK packet received from the receiving node is zero, indicating that the receiving node has no data packet fragment to be sent to the transmitting node, the data transmissions between the transmitting node and the receiving node are completed. The process goes to step S505, the transmitting node and the receiving node sense the channel. If it is determined at step S502 that the value of the Duration field contained in the ACK packet received from the receiving node is not zero, then it indicates that the receiving node has a data fragment to be sent to the transmitting node. In this case, the process goes to step S503 in which the transmitting node prepares for sending a CTS packet according to the ACK packet received from the receiving node. The value of the Duration field of the CTS packet is equal to the value of the Duration field of the received ACK packet minus one SIFS and the time period for sending the CTS packet. Moreover, the transmitting node, after sending the CTS packet, increments the number N of times for pair scheduling by 1. The transmitting node, after sending the CTS packet, goes to step S505 in which it enters into a channel sensing state.

Similarly, in a case where the receiving node has a data packet to be sent to the transmitting node and the data packet to be sent by the receiving node is divided into a plurality of fragments, the transmitting node will also check the value of the More Fragments field contained in the data packet received from the receiving node. If the value of the More Fragments field is "0", then it indicates that the data packets of the receiving node have already been sent out. If the value of the More Fragments field is "1", then it indicates that the receiving node still has some data packets to be sent to the transmitting node. In this case, the above described transmission procedure continues between the transmitting node and the receiving node, and each time an ACK packet sent by the counterpart is received, the number N of times for pair scheduling is incremented by 1, until it reaches the predefined maximum allowable number of times. The specific steps are the same as the aforementioned ones and thus the detailed description thereof is omitted.

Figure 6:
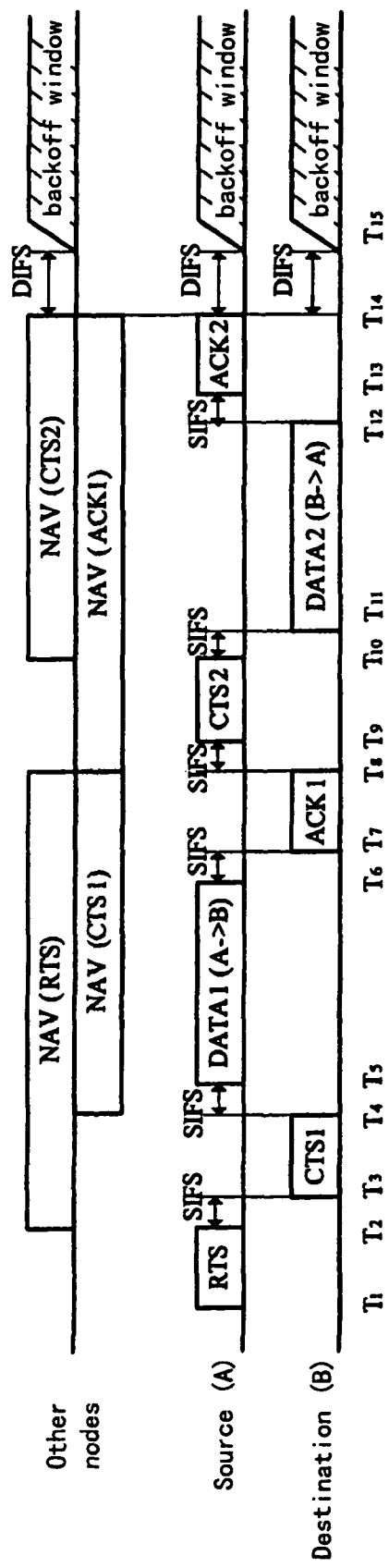
FIG. 6 is a sequence diagram of the medium access control procedure in a case of having RTS/CTS exchanges, according to the embodiment of the present invention.
Figure 7:
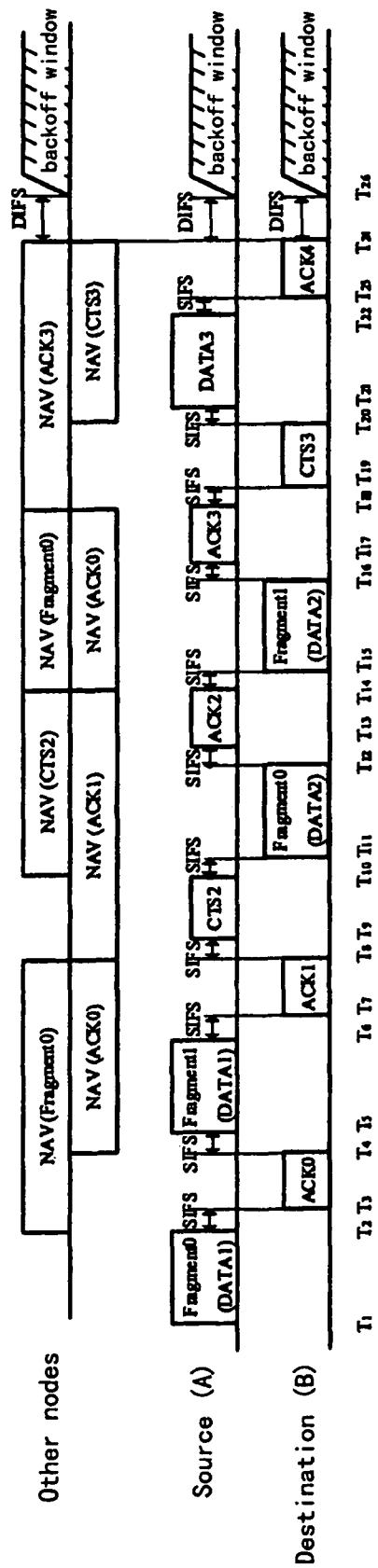
FIG. 7 is a sequence diagram of the medium access control procedure requiring data fragmentation in a case of no RTS/CTS exchanges, according to the embodiment of the present invention.

FIG. 6 and FIG. 7 illustrate the sequence diagrams of the medium access control procedure according to the embodiment of the present invention. In which, FIG. 6 is a sequence diagram of the medium access control procedure in a case of having RTS/CTS exchanges; and FIG. 7 is a sequence diagram of the medium access control procedure requiring data fragmentation in a case of no RTS/CTS exchanges.

In the wireless distributed network without fixed facilities, the receiving node performs pair scheduling detection and transmission, that is, when the last data fragment among the data packets directed to the receiving node is received, it detects whether the number of times for the currently performed pair scheduling is more than a predefined maximum allowable threshold for pair scheduling times or not. When it is less than that threshold, the receiving node detects whether there is any packet stored in its storage device, which is directed to the transmitting node of the data packet, or not. When such data packet exists, the receiving node schedules the packet into the header portion in the storage device, and sets in the Duration field of the ACK packet, a time period required for finishing this packet transmission including the sum of a time period for transmitting the first data fragment, a time period for sending one CTS, a time period for sending one ACK and three SIFSs, and sends the ACK packet.

Next, one embodiment of the present invention that has RTS/CTS exchanges will be described by referring to FIG. 6. It is assumed that the maximum allowable number N of times for pair scheduling is 1.

There is a packet to be sent to the node B in the transmission storing means 41 of the transmitting node A. When the channel accessing means 42 determines a channel accessing condition is satisfied, an RTS packet is sent at a time instant T1, a value of a Duration field thereof is equal to a sum of the time period for sending the CTS1, the time period for sending the packet DATA1 to be sent, the time period for sending the ACK1 and the time period of three SIFSs.

At a time instant T2, the receiving node B determines, using the packet processing means 47, that a packet directed to the present node is correctly received, and at a time instant T3 delayed by the SIFS, sends the CTS1 packet. The Duration field of the CTS1 packet is equal to the value copied from the Duration field in the RTS packet received from the transmitting node minus one SIFS and the time period for sending the CTS. Meanwhile, all the peripheral nodes receiving the RTS packets determining, using the packet processing means 47, that the packet is correctly received and the respective nodes are non-receiving nodes, and thus at the time instant T2, through the NAV storage timing means 44, use a larger value from the value of the Duration field in the packet and the current NAV value to update the NAV value (in the present embodiment, it is assumed that the current NAV value is zero).

Thereafter, at a time instant T4, the transmitting node A successfully receives the CTS1 packet from the receiving node B, and according to the indication of the packet processing means 47, at a time instant T5 one SIFS later, sends the data packet DATA1 to be sent (here, it is assumed that the length of DATA1 is shorter than a fragment threshold length, i.e., the data packet does not need to be fragmented). Since the data packet is not fragmented, the value of the More Fragments field of the packet is 0, and the value of the Duration field is equal to the time period for sending the ACK plus one SIFS. Also, all the peripheral nodes receiving the CTS1 around the receiving node B judge by use of the packet processing means 47, at the time instant T4, that the packet is correctly received and the respective nodes are non-receiving nodes, and thus perform the same update with the NAV storage timing means.

At a time instant T6, the receiving node B successfully receives the data packet DATA1 from the node A, and detects by use of the packet processing means 47 that the received packet is a packet directed to the present node and the value of the More Fragments field is zero for indicating that the node A has finished its data transmission to the node B. Then, the pair scheduling means 45 of the receiving node B determines the number of times for the currently performed pair scheduling. In the present embodiment, since the node B is not scheduled, it is detected whether any packet directed to the node A is stored in its transmission storing means 41 or not. In the example, it is assumed that the receiving node B has data DATA2 to be sent to the transmitting node A, and thus the node B schedules the packet DATA2 with priority, and includes its relevant information in the ACK1 packet immediate to be sent. In particular, the node B calculates the time period for sending DATA2 (it is assumed that the length of DATA2 does not reach the data fragmenting threshold), and puts a sum of the above time period, the time period for sending the CTS, the time period for sending the ACK and the time period of three SIFSs into the Duration field of the ACK1 to be sent by the node B. Then, at a time instant T7 delayed by the SIFS, the node B sends the ACK1 packet, and meanwhile the number of times for the performed pair scheduling is incremented by 1.

At a time instant T8, the node A successfully receives the ACK1 packet sent by the node B, and determines by use of the packet processing means 47 that it is a response to the data packet previously sent by the present node and the present node has no subsequent data fragment to be sent. Therefore, the node A detects the value of the Duration field contained in the ACK1 packet received from the node B. Here, since the value of the Duration field is not zero, the node A sends, at a time instant T9 delayed by the SIFS, a CTS2 packet, of which the value of the Duration field is equal to the value copied from the received ACK1 packet minus one SIFS and the time period for sending the CTS, and increments the number of time for pair scheduling of the present node by 1.

At the same time, at the time instant T8, all the peripheral nodes around the node B determine by use of the packet processing means 47 that the ACK1 packet is correctly received and the respective nodes are non-receiving nodes, and thus extract the Duration field of the ACK1 packet, and with the NAV storage timing means, update the NAV values as described above. Here, the updated NAV values are (T14-T8).

At a time instant T10, the node B successfully receives the CTS2 packet from the node A, and under the indication of the packet processing means 47, after the SIFS, at a time instant T11, sends the DATA2 which was scheduled preferentially at the time instant T6. Since the DATA2 packet is not fragmented, the value of the More Fragments thereof is zero. Meanwhile, all the peripheral nodes around the node A receive the CTS2, and as described above, update the NAV values in the NAV storage timing means with the value of the Duration field of the CTS2.

Thereafter, the node A successfully receives the data packet DATA 2 from the node B at a time instant T12. The node A detects through the packet processing means 47 that the received data packet DATA2 is a packet directed to the present node and the value of the More Fragments contained is zero. Thus, the pair scheduling means 45 of the node A makes a determination about the number of times for the performed pair scheduling. Because the number of times for the currently performed pair scheduling is 1 which reaches the maximum allowable number of times for pair scheduling, the node A sets the value of the Duration field of the acknowledgement packet into 0. At a time instant T13 delayed by the SIFS, the node A sends the acknowledgement packet ACK2, and after sending the ACK2, enters into the channel sensing state.

At a time instant T14, all the nodes around the node A (including the node B) receive the acknowledgement packet ACK2 from the node A, detect through the packet processing means that the Duration field is zero, and thus enter into the channel sensing state.

All the nodes perform the backoff procedure after the channel is sensed to be idle for the DIFS in order to prepare for a new channel contention.

Next, one embodiment of the present invention in which there are no RTS/CTS exchanges and requiring data fragmentation will be described by referring to FIG. 7. It is assumed that the maximum allowable scheduling number of times is 2.

At a time instant T1, when the channel accessing means 42 of the transmitting node A determines a channel accessing condition is satisfied, a data packet DATA1 is prepared for sending to the receiving node B. Since the node A detects that the packet length of the DATA1 is longer than the data fragmenting threshold, the DATA1 is then divided into two data fragments. The first data fragment Fragment0 is sent at the time instant T1, and the value of the Duration field thereof is equal to a sum of the time period for sending the next data fragment Fragment1, the time period for sending two ACKs, and the time period of three SIFSs. At this time, since more data fragments are to be sent, the value of the More Fragments field is set to 1.

At a time instant T2, the receiving node B successfully receives the data fragment Fragment0 of the DATA1, and detects that the present node is the receiving node and the value of the More Fragments of the packet is 1. Then, after one SIFS, at a time instant T3, the receiving node B sends an acknowledgement packet ACK0, of which the value of the Duration is equal to the value copied from the Duration field of the Fragment0 minus one SIFS and the time period for sending one ACK. At this time, all the peripheral nodes other than the node B around the node A while successfully receiving the packet Fragment0, at the time instant T2, update the NAV values of the NAV storage timing means in the same manner as described above, thus the current NAV values are (T8-T2).

At a time instant T4, the node A successfully receives the packet ACK0 from the node B, and judges through the packet processing means 47 that a data fragment is still to be sent. Then, the node A sends, at a time instant T5 delayed by the SIFS, the second data fragment Fragment1. Since Fragment1 is the last data fragment of DATA1, the value of the Duration field of the packet is set to be equal to a sum of the time period for sending the ACK and the time period of one SIFS, and the value of the More Fragments field is set to zero to indicate no other subsequent data packet. Meanwhile, at a time instant T4, other than the node A, all the nodes correctly receiving the packet ACK0 update the NAV values in the NAV storage timing means in the same manner as described above.

Next, at a time instant T6, the receiving node B successfully receives the data packet Fragment1 from the node A. The receiving node B detects through the packet processing means 47 that the packet is directed to the present node, and by detecting that the value of the More Fragments is zero, determines that it is the last data fragment of the data DATA1 sent by the transmitting node A. Thereafter, the receiving node B delivers the result to the pair scheduling means 45 for further detecting whether the number of times for the currently performed pair scheduling is more than the maximum allowable number of times for pair scheduling. Since the number of times for pair scheduling is zero, it is determined whether or not any packet directed to the node A is stored in the transmission storing means 41. In a case where it is detected, the transmission storing means 41 of the receiving node B stores a data packet DATA2 to be sent to the node A, the receiving node B schedules the packet DATA2 preferentially to a header portion of the storing means 41, and includes its associated information in the ACK1 packet immediate to be sent by the node B. Here, since the data length of the DATA2 is longer than the data fragmenting threshold, the DATA2 is divided into a plurality of data fragments, and the time period for sending one data fragment Fragment0 is calculated. A sum of the above time period, the time period for sending a CTS, the time period for sending an ACK and a time period of three SIFSs is added into the ACK1 packet as the value of the Duration field. At a time instant T7 delayed by the SIFS, the ACK1 packet is sent, and also the number of times for the performed pair scheduling of the present node B is incremented by 1.

At a time instant T8, the node A receives the acknowledgement packet ACK1 directed thereto, and checks through the packet processing means 47 that the value of the More Fragments field is not zero, and determines that there is a data fragment to be sent. In addition, since the Duration field of the ACK1 is not zero, the node A increments the number of times for the performed pair scheduling by 1, and sends a CTS2 packet at a time instant T9 delayed by the SIFS. In the CTS2 packet, the value of the Duration field is equal to the value copied from the Duration field of the ACK1 minus one SIFS and the time period for sending a CTS.

Additionally, other than the node A, all the nodes receiving the ACK1 at the time instant T8 update the NAV values stored in the NAV storage timing means thereof in the same manner as described above, and the updated NAV values are (T14-T8).

At a time instant T10, the receiving node B receives the CTS2 from the node A, and under the indication of the packet processing means 47, after the SIFS, at a time instant T11, sends the first data fragment Fragment0 of the DATA2 which was scheduled preferentially at the time instant T6, and the value of the More Fragments are set to "1", and the value of the Duration field is equal to a sum of the time period for sending the next data fragment Fragment1 of the DATA2, the time period for sending two ACKs and the time period of three SIFSs.

Meanwhile, other than the node B, all the peripheral nodes around the node A which successfully receive the CTS2 update the NAV values stored in the NAV storage timing means with the value of the Duration field contained in the CTS2 in the same manner as described above, and the updated NAV values are (T14-T10).

At a time instant T12, the transmitting node A receives the data fragment packet Fragment0 of the DATA1 packet from the node B, and detects that the present node is the receiving node of the data packet sent by the receiving node B, and the More Fragments field of the received data packet is 1. Thus, after the SIFS, at a time instant T13, the transmitting node A sends an acknowledgement packet ACK2, of which the value of the Duration field is equals to the value copied from the Duration field of the Fragment0 minus one SIFS and the time period for sending one ACK.

Meanwhile, other than the node A, all the nodes around the node B when successfully receiving the Fragment0, at the time instant T12, update the NAV values stored in the NAV storage timing means in the same manner as described above such that the current NAV values are (T18-T12).

At a time instant T14, the node B successfully receives the packet ACK2 sent from the node A, and in the same operation manner as the node A at the time instant T4, at a time instant T15 delayed by the SIFS, sends the subsequent data fragment Fragment1, of which the value of the More Fragments is set to "0". Other than the node B, all the peripheral nodes around A update their NAV values into (T18-T14) in the same manner as described above.

At a time instant T16, the node A successfully receives the data fragment Fragment1 from the node B, and detects through the packet processing means 47 that the value of the More Fragments field of the data fragment Fragment1 is 0, thereby determining that the data fragment Fragment1 is the last data fragment of the data packet DATA2. Then, the pair scheduling means 45 of the node A detects the number of times for the currently performed pair scheduling. Since the current number of times for the pair scheduling is 1 which is smaller than the maximum allowable number 2 of times for pair scheduling, it is detected whether any data packet directed to the node B is stored in the transmission storing means, and in the same operation manner as the time instant T6, the value of the Duration field is calculated and included in an ACK3 which is then sent at a time instant T17. At the same time, the number of times for pair scheduling of the node A is incremented by 1.

The operations for the following time instants T18-T21 are identical with those for T8-T11 in the Embodiment 1, and for simplification, the detailed descriptions thereof are omitted.

Thereafter, at a time instant T22, the node B successfully receives the data packet DATA3 from the node A, and since this packet is not fragmented, the value of the More Fragments field is zero. Then, the pair scheduling means 45 of the node B detects the number of times for the currently performed pair scheduling. Since the number of times for pair scheduling is 2 which reaches the maximum allowable number of times for pair scheduling, the Duration field of the ACK4 is set to zero, and the ACK4 is sent at a time instant T23. Thereafter, all the nodes enter the channel sensing state in order to prepare for a new channel access.

Figure 8:
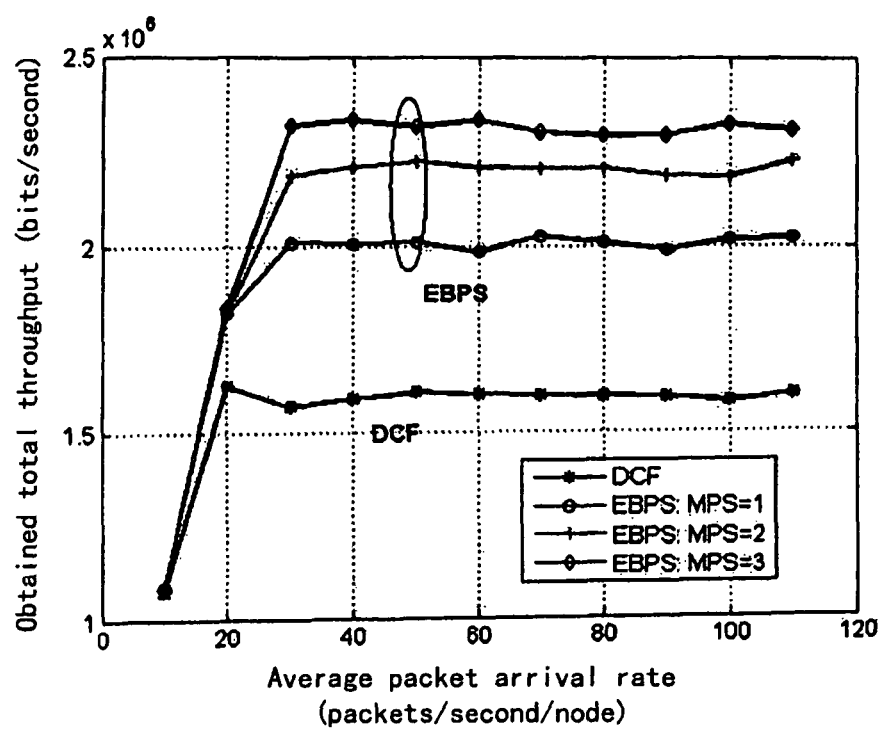
FIG. 8 is a simulation result of the system throughput under a symmetric service simulation condition by using the method of the invention.

FIG. 8 is a simulation result of the system throughput in a symmetric service simulation condition by using the inventive method. For illustrating the effectiveness of the present invention, a computer simulation is performed with a matlab-based simulation platform. In the simulation, the maximum allowable number of times for pair scheduling (MPS) is given, and the relationship between the system load and the throughput is achieved under different specified MPS. As shown in FIG. 8, the horizontal axis represents an average packet arrival rate at each node, in a unit of packets/second, while the vertical axis represents a total throughput of the system in a unit interval. The result shows that with the increase of the average packet arrival rate, the improvement on the performance of the present invention increases as compared with DCF; and with the increase of the maximum allowable number of times for pair scheduling, the gain of the throughput will significantly increase.

According to one embodiment of the present invention, through scheduling respective transmissions with each other by the nodes which have successfully obtained the channel in contention, it is possible to avoid sending these packets in a random channel access manner within a range of the maximum allowable number of times for pair scheduling, so that the probability of packet collisions is decreased, and in a case where an RTS/CTS handshaking procedure is employed, the overhead due to the control packets in channel contentions is also reduced, thereby to utilize the channel resources more effectively.

Additionally, at least one embodiment of the present invention needs no additional hardware support, but achieves the performance improvement by the existing control packets and the field definitions thereof. Therefore, such embodiments of the present invention can be easily implemented, and has a good backward compatibility. Finally, by setting the maximum allowable number of times for pair scheduling, it is possible to flexibly adjust the time period of pair scheduled transmissions, for example, for a node of high priority, a large maximum allowable number of times for pair scheduling is set in order to support the quality of services.

Note that the inventive medium access control methods can be implemented with either of hardware and software, or the combination thereof.

Hereto, the present invention has been described with the preferred embodiments thereof. Those skilled in the art should understand that any other changes, substitutions and supplements are possible without departing from the sprits and scopes of the present invention. Therefore, the present invention is not intended to be limited by the above specific embodiments but only limited by the following claims.

What is claimed is:

1. A pair scheduling medium access control method used for performing pair scheduling medium access control in a wireless network, comprising the steps of:
checking, by a receiving node, which is a node addressed by a transmitting node, whether the transmitting node has data packets to be subsequently sent to the receiving node or not, according to data packets received from the transmitting node;
when the transmitting node has no data packets to be subsequently sent to the receiving node, checking, by the receiving node, whether the receiving node has data packets to be sent to the transmitting node or not;
setting, in the transmitting node and the receiving node, a maximum allowable number N of times for pair scheduling of which the receiving node is allowed to send data packets to the transmitting node, wherein N is an integer;

if the receiving node has data packets to be sent to the transmitting node, adding a time period required for sending the data packets of the receiving node into an acknowledgement packet to be sent to the transmitting node; and after the receiving node receives a Clear to Send packet sent from the transmitting node, sending the data packets in the receiving node to the transmitting node.

2. The method according to claim 1, further comprising a step of scheduling the data packets to be sent into a header portion of storage means when the receiving node checks that there are data packets to be sent to the transmitting node.

3. The method according to claim 1, further comprising a step of sending a Clear to Send packet to the receiving node when the transmitting node has completely sent its own data packets and receives an acknowledgement package with a non-zero duration field.

4. The method according to claim 1, further comprising a step of incrementing the number of times for the pair scheduling by 1 each time after the receiving node sends one data packet to the transmitting node.

5. The method according to claim 4, further comprising the steps of:

before the receiving node sends the data packets to the transmitting node, checking, by the receiving node, whether the number of times for the currently performed pair scheduling is more than the maximum allowable number of times for pair scheduling or not; and only when the number of times of the currently performed pair scheduling is less than the maximum allowable number N of times for pair scheduling and the data packets to be sent to the transmitting node are stored, sending the data packets to the transmitting node.

6. The method according to claim 1, wherein the checking step:

detects a value of a More fragments field in a frame control field of the data packet and that the time period required for sending the data packets of the receiving node to the transmitting node is set in a duration field in an acknowledgement packet.

7. The method according to claim 1, further comprising a step of fragmenting the data packet if a length of a data packet to be sent by the transmitting node and the receiving node is more than a respective data fragment threshold defined in the respective medium access control layer.

8. The method according to claim 1, further comprising a step of detecting, by the receiving node, that a receiving node address contained in the received data packet is identical with that of a present node when receiving a data packet sent from the transmitting node.

9. The method according to claim 1, further comprising the steps of at a node whose node address is not identical to the destination address contained in the received data packet of:

extracting a value of a duration field of the data packet and comparing it with a value of a network allocation vector in the present node; and based on the comparison result, updating the value of the network allocation vector with the larger value.

10. The method according to claim 4, further comprising the steps of:

when the receiving node checks that the number of times for pair scheduling of the present node is equal to or more than the maximum allowable number of times for pair scheduling, stopping sending data packet fragments to the transmitting node; and making the transmitting node and the receiving node enter into a state for sensing channels.

11. The method according to claim 3, wherein the step of sending the Clear to Send packet comprises a step of setting a value of the non-zero duration field of the Clear to Send packet equal to subtracting the sum of one Short Interframe Space and the time period required for sending the Clear to Send packet from the value of the non-zero duration field of the received acknowledgement packet.

12. The method according to claim 6, wherein the value of the Duration field of the acknowledgement packet is set to equal to subtracting the sum of one Short Interframe Space and the time period required for sending the acknowledgement packet from a Duration value extracted from the received data or data fragment packet when the detected value is not zero.

13. The method according to claim 6, wherein the value of the Duration field of the acknowledgement packet is set to equal to the sum of a time period required for sending the data or data fragment and a time period for sending one Clear to Send packet and one acknowledgement packet and a time period of three Short Interframe Spaces when the detected value is zero.

14. The method according to claim 1, further comprising a step of setting by the transmitting node and the receiving node, a value of a fragment field of a current data packet fragment followed by other data packets to be sent to 1, and setting a fragment field of the last sent data packet fragment to 0.

15. A mobile terminal used in a wireless network, for performing pair scheduling medium access control in the wireless network, comprising means to carry out the method steps according to claim 1.

* * * * *